(12) United States Patent
Mackiewicz et al.

(10) Patent No.: US 6,591,611 B2
(45) Date of Patent: Jul. 15, 2003

(54) HYDRAULIC BRAKE BOOSTER

(75) Inventors: John E. Mackiewicz, Niles, MI (US); William John Penninger, Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 112 days.

(21) Appl. No.: 10/012,669

(22) Filed: Oct. 30, 2001

(65) Prior Publication Data

US 2003/0079473 A1 May 1, 2003

(51) Int. Cl.$^7$ ................................................ B60T 13/12
(52) U.S. Cl. ........................................... 60/552; 60/553
(58) Field of Search ..................................... 60/553, 552

(56) References Cited

U.S. PATENT DOCUMENTS

| | | | | |
|---|---|---|---|---|
| 3,877,227 A | * | 4/1975 | Demido | 60/552 |
| 4,015,881 A | * | 4/1977 | Adachi | 60/551 |
| 4,462,300 A | * | 7/1984 | Belart | 60/551 |
| 5,090,293 A | * | 2/1992 | Winterlik | 60/553 |

FOREIGN PATENT DOCUMENTS

DE   3723914 A1   *   2/1989   ........... B60T/13/12

* cited by examiner

Primary Examiner—Edward K. Look
Assistant Examiner—Igor Kershteyn
(74) Attorney, Agent, or Firm—Leo H. McCormick, Jr.; Warren Cornstock

(57) ABSTRACT

A hydraulic brake booster (12) having a housing (100,200) with a first bore (102) separated from a second bore (104). The first bore (102) retains a power piston (50) and the second bore (104) retains a control valve (60). The first bore (102) is connected by a passage (112) to the second bore (104) that is connected to a source of pressurized supply fluid (24). In responsive to a desired braking force being applied to the input member (30,30'), the lever arrangement (80) moves the control valve (60) to allow controlled pressurized supply fluid to be communicated from the second bore (104) by way of passage (12) to the first bore (102). The hydraulic brake booster (12) is characterized by adjustable regulator means (300) connected to the first bore (102) for communicating a proportional reaction signal to the input member (30, 30') that is derived from the controlled pressurized supply fluid to produce a variable gain between the input force applied to the input member (30, 30') by the operator and the operational force developed through the power piston (50) to effect a brake application.

11 Claims, 4 Drawing Sheets

HYDRAULIC BRAKE BOOSTER

HYDRAULIC BRAKE BOOSTER

This invention relates to an adjustable regulator for developing a proportional reaction signal to produce a variable gain between an input force provided by an operator and a operational force supplied by a brake booster to a master cylinder to effect a brake application.

BACKGROUND OF THE INVENTION

In hydraulic brake boosters of a type disclosed in U.S. Pat. Nos. 4,441,319 and 6,226,993, a control valve is moved by an input force applied to a brake pedal by an operator to regulate the flow of pressurize fluid from a source to an operational chamber. The regulated pressurized fluid acts on a power piston to provide.and operational force that moves pistons in a master cylinder to pressurize fluid that is supplied to wheel brakes to effect a brake application. A reaction force produced by boost pressure in the movement of the power piston is transmitted back to the brake pedal to balance the input force such that the operational force supplied to move the pistons in the master cylinder is a linear function of the input force applied to the brake pedal.

The structure in hydraulic brake boosters of a type disclosed in U.S. Pat. Nos. 4,281,585; 4,539,892; and 4,625,515 while similar in producing an operational force is different in that a housing has a first and second bores connected to a pressure chamber with a power piston located in the first bore and a control valve located in the second bore. The control valve is connected to the brake pedal by a lever arrangement connected to the power piston. An input force applied to the brake pedal causes the lever arrangement to pivot about the power piston and move the control valve to allow pressurized fluid to flow into the pressure chamber. The pressurized fluid acts on the power piston to move pistons in a master cylinder and develop a pressurized fluid that is supplied to the wheel brakes to effect a brake application. A reaction force produced by the movement of the power piston is transmitted back to the brake pedal back from the power piston to the brake pedal to balance the input force such that the output force produced is a linear function of the input force applied to the brake pedal.

While the above prior art hydraulic brake boosters function in an adequate manner, the control valve, lever arrangement, input member and powers piston are all exposed to pressurized fluid during a brake application resulting in a need to provide for high pressure seals with respect to all openings and sliding surfaces. Structure has been disclosed in co-pending U.S. patent application Ser. No. 09/894,106 whereby the lever arrangement and input member are isolated from the pressurized fluid.

It has been suggested those additional features such as traction control, dynamic operational control and anti-skid control are desirable in a hydraulic brake booster to provide a total brake system. However, as the brake pedal in such hydraulic brake boosters mirrors the movement of the power piston additional structure is needed to hold the brake pedal stationary during a functional performance relating to such additional features. One way to hold the brake pedal stationary during such additional functions is disclosed by the structure in U.S. Pat. No. 6,203,119 wherein a control valve seat moves while the input member remains in a stationary position to meter operational pressurized fluid from a secondary source to effect a brake application.

SUMMARY OF THE INVENTION

A primary object of the present invention is to develop a variable gain between an input force applied by an operator to a push rod and a operational force supplied by a brake booster to a master cylinder to effect a brake application.

According to this invention, a hydraulic brake booster for use in a brake system has a housing with a first bore therein separated from a second bore. The first bore is connected to the second bore by a passage and the second bore is connected to a source of pressurized supply fluid. The first bore retains a power piston and the second bore retains a control valve. An input member connected to a brake pedal is connected to the power piston and linked to the control valve by a lever arrangement. The lever arrangement transmits an actuation force derived from an input force applied to the input member to operate the control valve and allow controlled pressurized supply fluid to be communicated from the second bore through the passage to the first bore. The controlled pressurized supply fluid supplied to the first bore acts on the power piston to develop an operational force that is supplied to move pistons in a master cylinder to effect a desired brake application. The first bore is also connected to a stepped bore that retains an adjustable regulator means characterized by first and second restricted orifices that are created by locating surface configuration on a shaft with respect to corresponding surfaces in the stepped bore. A portion of the controlled pressurized supply fluid that is supplied to the actuation chamber is communicated to the stepped bore and flows through the first and second orifices to a reservoir. In flowing through the first and second orifices, the controlled pressurized supply fluid experiences a pressure drop and it is this pressure of the fluid as present in the stepped bore between the first and second orifices that is communicated as a proportional reaction signal to act on the input member to balance the input force applied to the brake pedal by the operator. This functional operation results in an operational force created by the controlled pressurized fluid acting on the power piston which has a variable gain with respect to the input force applied to the input member by the operator to effect a brake application.

An advantage of this invention resides in a brake booster wherein a reaction force received by an operator during a brake application varies as a function of the controlled pressurized fluid supplied to a power piston to develop an operational force.

A further advantage of this invention resides in the ability to adjust a gain of input force applied to a brake pedal with respect to an operational force produced by a brake booster.

DETAILED DESCRIPTION

Figure 1:
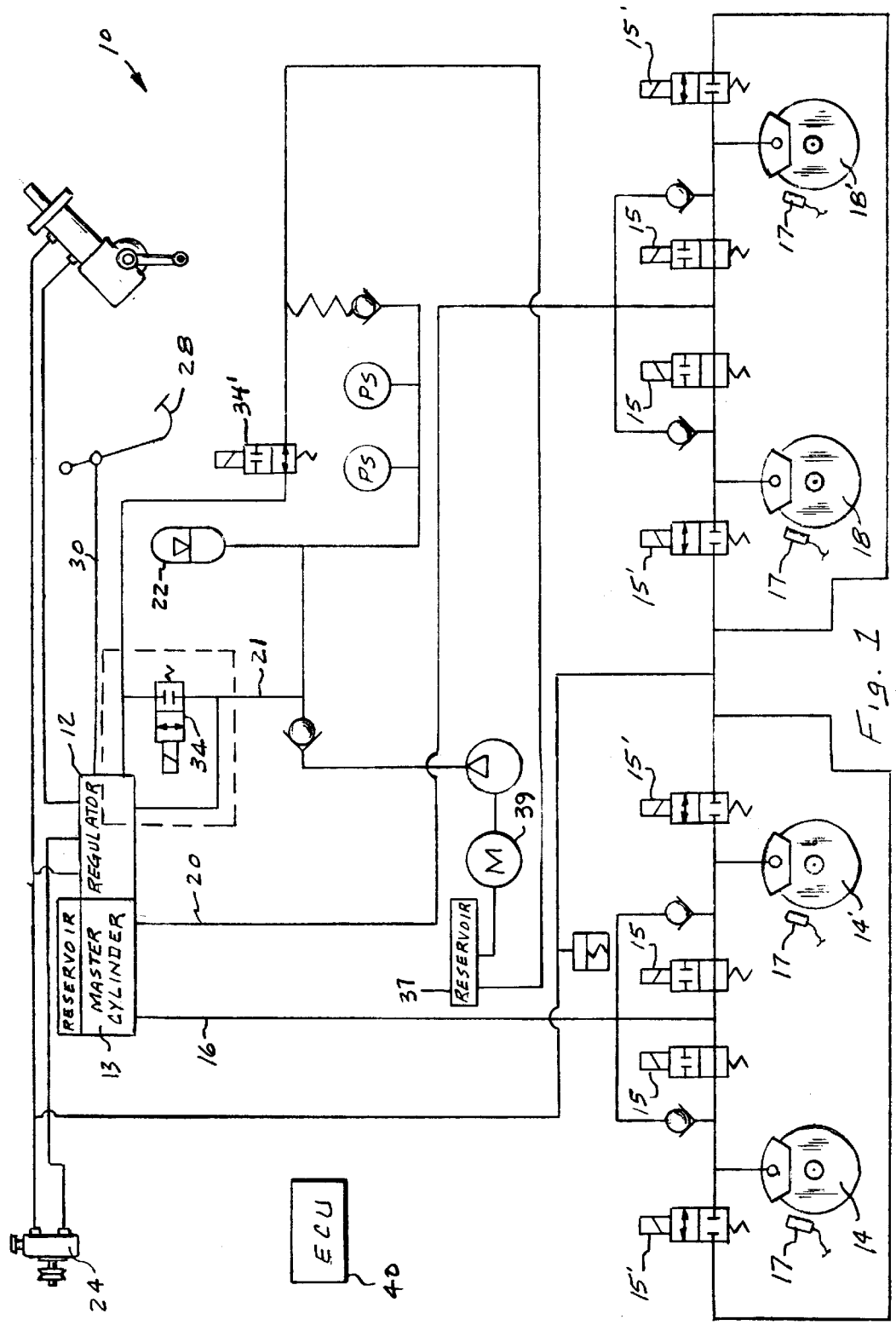
FIG. 1 is a schematic illustration of a brake system with a hydraulic brake booster made according to the principals of the present invention.

The brake system 10 as shown in FIG. 1 includes a hydraulic brake booster 12 for supplying a master cylinder 13 with an operational force to pressurized fluid that is supplied to a first set of wheel brakes 14,14' by a first conduit 16 and to a second set of wheel brakes 18,18' by a second conduit 20 to effect a brake application. The hydraulic brake booster 12, which is commonly referred to as an open center booster, receives pressurized supply fluid flowing from a pump 24 shared with a power steering system of a vehicle. The hydraulic brake booster 12 may be selectively activated by either a manual force applied through a brake pedal 28 to input rod assembly 30 connected to a lever arrangement 80 which activates a control valve 60 to develop an operational force to effect a first brake application or by a hydraulic force developed as a function of a signal received from an electronic control member (ECU) 40 that activates a solenoid valve 34 to allow pressurized hydraulic fluid to flow from an accumulator 22 and activate the control valve 60 to effect a second brake application.

The brake system 10 also includes a build solenoid valve 15, a decay solenoid valve 15' and a wheel speed sensor 17 for each wheel in the first set of wheel brakes 14, 14' and second set of wheel brakes 18, 18' to provide the electronic control unit (ECU) 40 with an input signals to provide information or data relating to a current functional operational of the vehicle. In addition to these input signals, the ECU 40 also receives and evaluates other inputs and data relating to the vehicle including but not limited to: the operation of the motor pump; the pressure of the pressurized supply fluid; dynamic forces experienced by the vehicle; accumulator fluid supply pressure, the level of fluid in a reservoir and etc. all inputs which relate to the operation of the vehicle and may effect a brake application.

Functionally, the hydraulic brake booster 12 responds to an operator input force applied to brake pedal 28 by an operator to develop an operational force which moves pistons in master cylinder 13 to develop and supply pressurize fluid to operate wheel brakes 14, 14' and wheel brakes 18, 18' and effect a brake application. On termination of the operator input force to brake pedal 28, the operation of the brake booster 12 is returned to a rest state as illustrated in FIG. 1. However, during the operating of the vehicle should inputs relating to the operational features or conditions currently experienced by the vehicle as evaluated by the ECU 40 indicate a less than optimum operation situation is occurring or forthcoming, the ECU 40 is programmed to transmit an operating signal that activates a solenoid 34 to allow pressurized hydraulic fluid to flow from the accumulator 22 and independently activate the control valve 60 of the hydraulic brake booster 12 to provide for the development of a secondary brake application. When hydraulically activated, the control valve 60 is moved to restrict the flow of pressurized supply fluid from pump 24 to create controlled pressurized supply fluid that is provided to act on the power piston 50 and create an operational force that acts on pistons in the master cylinder 13 to produce pressurized fluid that is supplied to individually activate the wheel brakes 14, 14' and 18, 18' in accordance with signals from the ECU 40 to effect a brake application and attenuate a less than optimum operating condition which could effect the safe operation of the vehicle.

Figure 2:
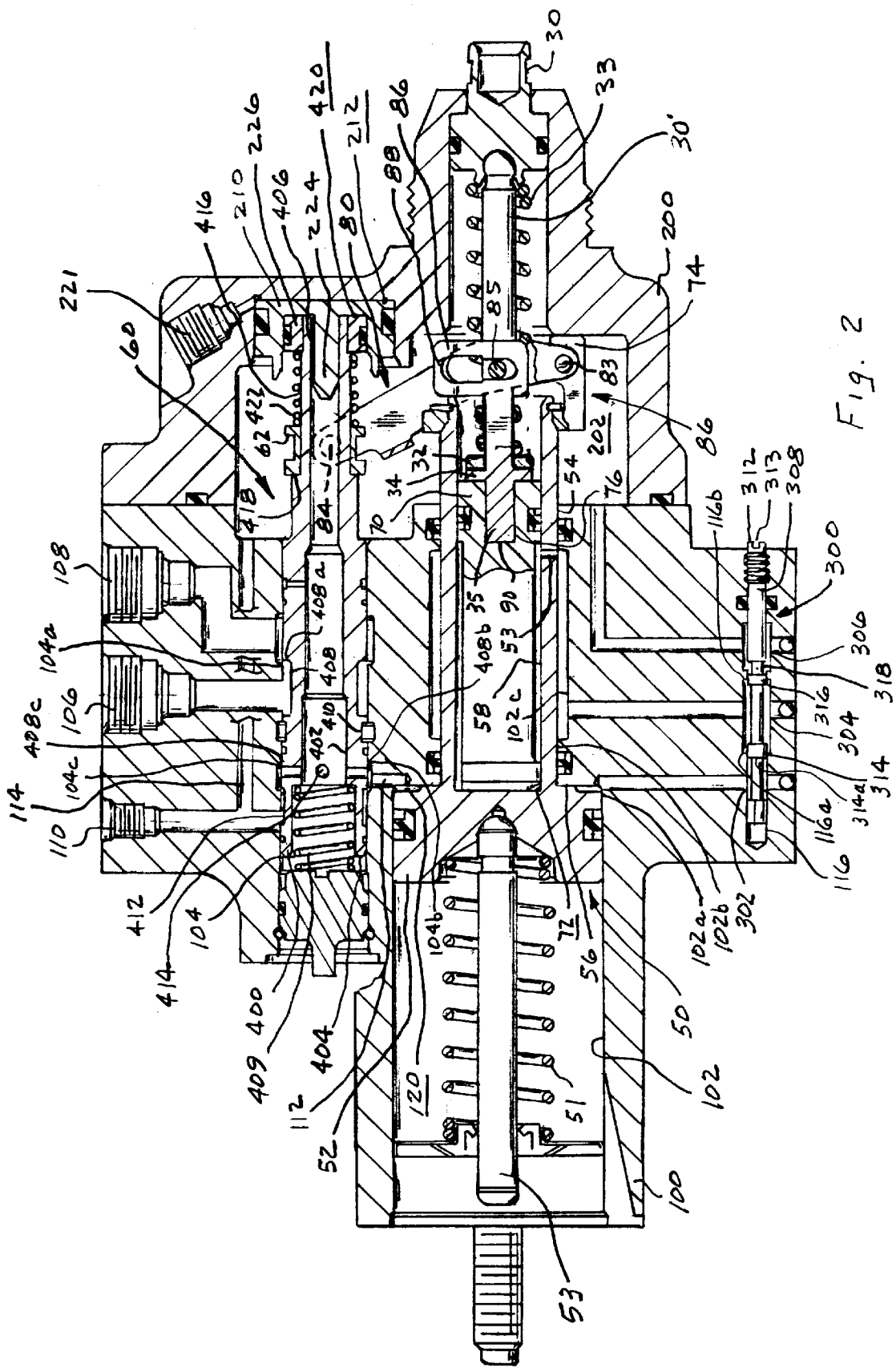
FIG. 2 is a sectional view of the hydraulic brake booster of FIG. 1 in a rest condition.
Figure 3:
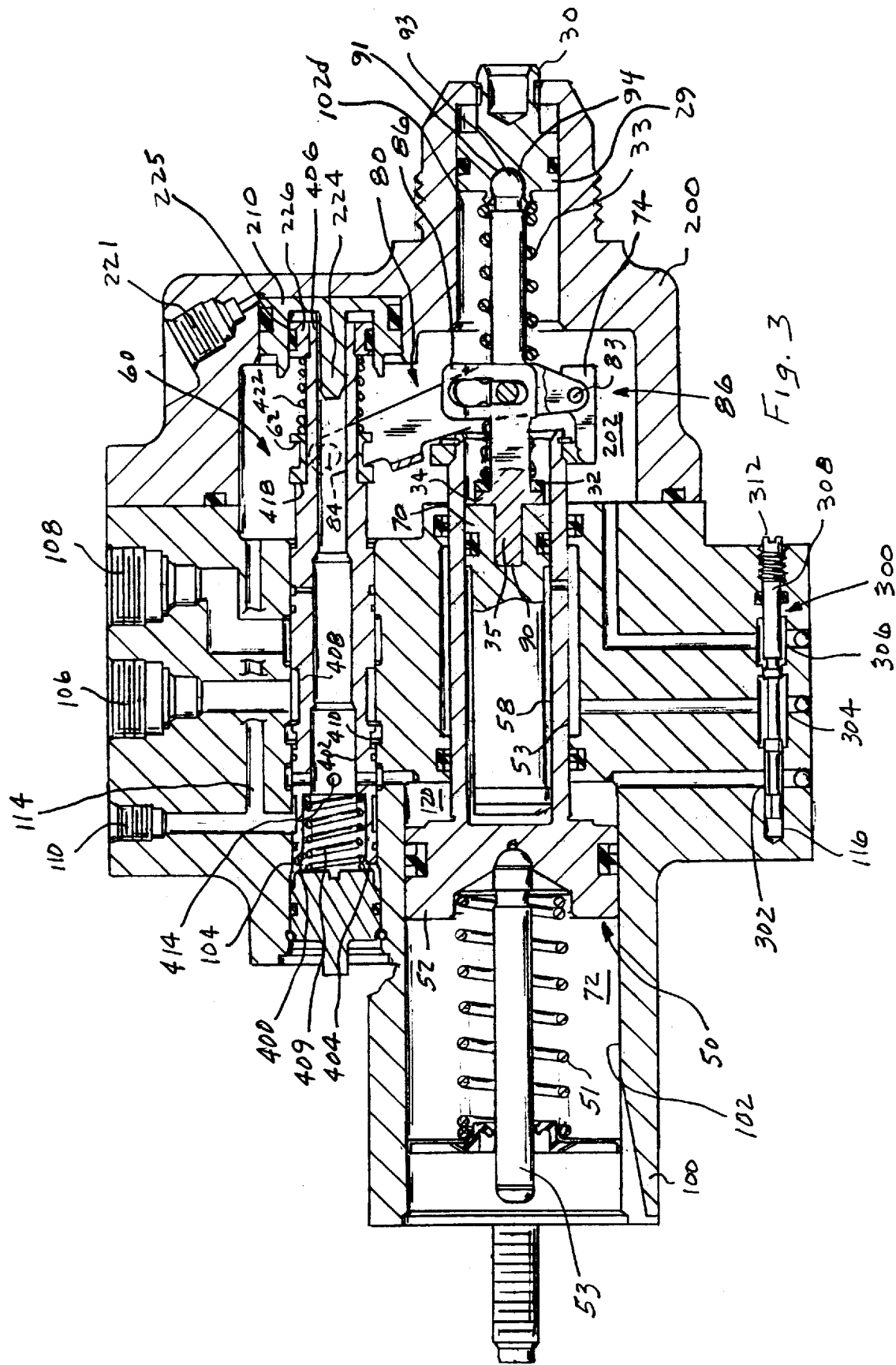
FIG. 3 is a sectional view of the hydraulic brake booster of FIG. 1 in an actuation condition.
Figure 4:
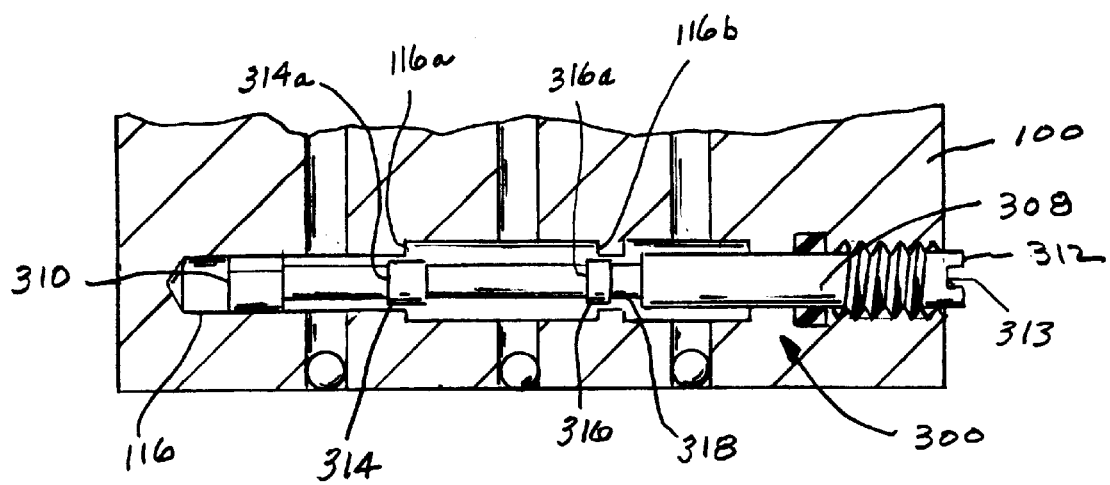
FIG. 4 is an enlarged view of a regulator valve of FIG. 3.
Figure 5:
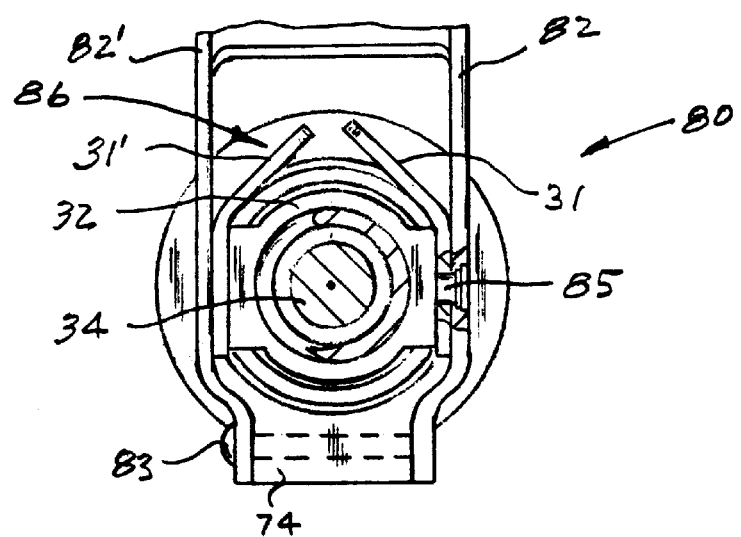
FIG. 5 is sectional view of the lever arrangement of FIG. 2.

The hydraulic brake booster 12 as best shown in FIGS. 2, 3 and 4 includes a first housing 100 and a second housing 200 to form a unitary structure. A power piston 50 is sealingly retained in a first bore 102 in the first housing 100 while a control valve 60 is sealingly retained in a second bore 104 therein.

In more particular detail, the first housing 100 includes an inlet port 106 connected to receive pressurized hydraulic fluid from pump 24; an exit port 108 connected to a steering system; a relief port 110 connected to a reservoir for pump 24; a control passage 112 for connecting the second bore 104 with the first bore 102; a relief passage 114 for connecting an actuation chamber 202 formed in the second housing 200 with the relief port 110; a third stepped bore 116 for retaining an adjustable regulator valve 300; an inlet passage 302 for connecting the stepped bore 116 with a first diameter section 102a of bore 102, a control passage 304 for connecting the stepped bore 116 with a second diameter section 102b of the first bore 102, and a relief passage 306 for connecting the stepped bore 116 with the actuation chamber 202; and a groove 102c through which control passage 304 is connected to axial bore 58 in power piston 50 by way of radial passage 53 in the second diameter section 54 of the power piston 50.

The power piston 50 which is located in the first bore 102 has a cylindrical body with a first diameter section 52 separated from a second diameter section 54 by a shoulder 56, an axial or reaction bore 58 in the second diameter section 54 and radial passage 53 that extends through the second diameter section 54. The first diameter section 52 is sealingly positioned in a first diameter section 102a of the first bore 102 to define an operational chamber 120 within housing 100. The second diameter section 54 of the power piston 50 is sealingly positioned in a second diameter section 102b of housing .100 and a portion thereof extends into the actuation chamber 202 of the second housing 200. A thumb 74 that extends from end of the second diameter section is connected to the lever arrangement 80 by a pin 83.

The adjustable regulator valve 300, as best illustrated in FIG. 4, includes the stepped bore 116 in housing 100 and a shaft 308 with a first end 310 and a second end 312. The shaft 308 has a cylindrical body with a first rib 314 located adjacent the first end 310, a second rib 316 located between the first rib 314 and the second end 312 and a groove 318 located between the second rib 316 and the second end 312. The first end 310 is smooth while the second end 312 has threaded and mated with corresponding threads in housing 100. The shaft 308 is located in the stepped bore 116 that a first face 314a on the first rib 314 is positioned adjacent a first seat 116a in bore 116 to define a first restricted orifice and a second face 316a on the second rib 316 is positioned adjacent a second seat 116b to define a second restricted orifice in the stepped bore 116. The second end 312 has a key-way 313 which receives a tool to permit rotation of the shaft 308 to correspondingly adjust size of the first and second restricted orifices such that communication between inlet port or passage 302 and relief port or passage 306 may be changed by an operator to create a desired flow between the operational chamber 120 and actuation chamber 202. It would be possible to derive a proportional reaction signal as a result of a pressure drop that would occur in the flow of controlled pressurized supply fluid on flowing through the first orifice but to provide for a smoother operation resulting from the proportional reaction signal is derived from the double pressure drop experienced by the flow through the first and second orifices.

This adjustment of the adjustable regulator valve 300 could also be provided by an electromechanical means in conjunction with hydraulic actuation by the ECU. In such a system, shaft of the regulator valve could be part of a plunger in a solenoid and the coil would be connected to receive an input from the ECU 40 to selectively position shaft to modify a pressure drop of the controlled pressurized supply fluid as received at inlet port 302 and discharged through relief port 306 into actuation chamber 202 which is designed to be at reservoir pressure. Thus a use of electromechanical means could provide a dynamic variable operation of the brake booster 12 when a brake application is effected by ECU 40 in response to an anti-skid situation or during a constant deceleration braking situation.

A reaction piston 70 is sealingly located in axial bore 58 of the second diameter 54 of the power piston 50 to define a reaction chamber 72. Reaction chamber 72 is connected to passage 304 by way of slot 102c in housing 100 and radial passage 53 in the second diameter 54.

The lever arrangement 80 which is attached to thumb 74 on the power piston 50 is similar to the levers disclosed in the prior art and in particular U.S. patent application Ser. No. 09/894,106 and U.S. Pat. No. 4,625,515. The lever arrangement 80 includes first and second arms 82, 82' that have a first end pivotally attached to thumb 74 by pin 83 and a second end with a nib or button 84 located in a sleeve or collar 62 carried on spool of the control valve 60. A bracket 86 carried by push rod extension 30' has a base 32 which is urged into engagement with a shoulder 34 on the push rod extension by spring 33. A cylindrical projection 35 that extends from shoulder 34 defines a first end 90 for an input rod assembly 30, extends into axial bore 76 of the reaction piston 70. A second end 91 of the push rod extension 30' has semi-spherical head 93 that is located in a socket 94 on sealed bearing 29 retained in axial bore extension 102d located in the second housing 200. The retention of the semi-spherical head 93 in socket 94 allow for limited movement without lateral forces that would detract from an input force applied to the lever arrangement 80. Parallel side walls 31, 31' that extend away from base 32 each have a vertical slot 88 (only one of which is shown) for receiving a corresponding nib or button 85 located on arms 82, 82' to form a connection with input push rod extension 30'. The functional operation of the sleeve or collar 62 with the lever arrangement 50 allows for independent movement of the power piston 50 and control valve arrangement 60 such that movement of the input push rod 30 remains stationary during hydraulic actuation of the control valve 60 by the ECU 40.

The control valve 60 is of a type known in the prior art wherein a spool 400 located in the second bore 104 has an axial bore 402 that extends from a first end 404 to a second end 406. A spring 409 acts on the first end 404 to urge the second end 406 into engagement with a piston 210 associated with the hydraulic actuation of the control valve 60 by the ECU 40 located in chamber 212 in the second housing 200. Spool 400 has several lands and grooves including a first groove 408 which is positioned adjacent inlet port 106 in housing 100, an intermediate or second groove 410 and a third or relief groove 412 connected to the relief port 110. The spool 400 also has a cross bore 414 between the second groove 410 and the third groove 412 and a diameter 416 that extends from shoulder 418 which receives sleeve 62 of the lever arrangement 60.

The second housing 200 in addition to defining the actuation chamber 202 wherein the lever arrangement 80 and input push rod arrangement 30 are located has a chamber 212 which is aligned with the second bore 104 for retaining piston 210. Piston 210 is sealed in chamber 212 and has a projection 224 that is located in bore 402 of bore spool 400. A cylindrical member 226 that is press fit onto the end 406 of spool 400 engages surface 225 on piston 210 to define a balancing chamber 420 adjacent the second end 406 of spool 400. Projection 224 has a slot or flow path therein that allows fluid to freely flow to the balancing chamber 420 and act on end 406 and cylindrical to balance a corresponding force that acts on end 404 of the spool 400 such that the input applied to move spool 400 is not effected by the development of the pressurized supply fluid in the activation of the control valve 60. A spring 422 that surrounds diameter 416 of spool 400 engages the cylindrical member 226 to hold sleeve 62 against shoulder 418 such that the lever arrangement 80 is held in a rest position as illustrated in FIG. 2 by return spring 409.

Mode of Operation of the Brake Booster

For a given vehicle the operational force developed by an input force applied to a brake booster to meet operational braking parameters is effected by several factors including weight of the vehicle, size of the power piston in the brake booster and the available hydraulic fluid pressure developed by a source. However, once the parameters have been defined the component parts that make up a brake system can be defined to meet the braking parameters or objectives. For instance in a brake system equipt with a hydraulic brake booster 12, the gain between the input force applied to the brake pedal 28 by an operator and the operational force developed by controlled pressurized fluid acting on a power piston 54 is selectively established by the adjustable regulator valve 300. The adjustable regulator valve 300 modifies the effect of a reaction force that is communicated to balance the input force applied by the operator. The gain is set during the of manufacturer of the hydraulic brake booster 12 by establishing a space relationship between a first face 314a on the first rib 314 of a shaft 308 and a first seat 116a in bore 116 of housing 100 to define the first restricted orifice and a second face 316a on the second rib 316 of shaft 308 and a second seat 116b in bore 116 to define a second restricted orifice in the stepped bore 116. The controlled pressurized fluid presented to operational chamber 120 during a brake application is communicated to the adjustable regulator valve 300 through an inlet port or passage 302 to the stepped bore 11 6 and on flowing past the first restricted orifice experiences a first pressure drop and on flowing past the second restricted orifice to the relief port 110 experiences a second pressure drop to define a proportional reaction signal that is communicated through control port or passage 304 to reaction chamber 72 to produce a force that balances the input force applied by an operator to effect a brake application.

In more detail, when an operator desires to effect a brake application in a vehicle equipt with the hydraulic brake booster 12, an input force is applied to brake pedal 28 to effect a brake application is communicated through input push rod 30. The input push rod 30 acts on lever arrangement 80 by pivoting arms 82, 82' on projection 74 of reaction piston 70 to move spool 400 by way of sleeve 62 to restrict the flow of pressurized fluid from pump 24 through the inlet port 106 to the exit port 108 by way of bore 104 as illustrated in FIGS. 3 and 4. On initial movement of spool 400 in bore 104, a land 408a on spool 400 moves toward a land 104a in housing 100 and land 408b moves past land 104b to seal bore 104 from relief port 110 and with further movement, land 408c moves past land 104c to allow controlled pressurized fluid to be communicated operational chamber 120 by way of control passage 112. The controlled pressurized fluid as presented to operational chamber 120 acts on the first diameter section 52 of the power piston 50 to create an operational force that is transmitted by push rod 51 to move pistons in master cylinder 13 and pressurize fluid therein. The pressurized fluid from the master cylinder 13 is transmitted to wheel brake 14, 14' and 18, 18' to effect a brake application. The controlled pressurized fluid presented to operational chamber 120 is communicated to the adjustable regulator valve 300 by way of inlet port or passage 302 in stepped bore 116 in housing 100 and on flowing through the first restricted orifice toward the relief port or passage 306 experiences a first pressure drop and on flowing through the second restricted orifice to the relief port experiences a second pressure drop as the exit pressure at the relief port or passage 306 is at atmospheric or reservoir pressure per the communication of actuation chamber 202 to relief port 110 by way of passage 114. The fluid pressure of the controlled pressurized fluid in stepped bore 116 between the first and second orifices is communicated to reaction chamber 72 and acts on reaction piston 72 to produce a reaction force which is communicated back to input rod 30 by way of lever arrangement 80 to oppose and balance the input force applied by the operator. Since the proportional reaction signal (pressure) communicated to the reaction chamber 72 is a derived through the pressure drop of the controlled pressurized supply fluid flowing through the first and second restricted orifices a variable gain is achieved to effect a brake application. On termination of the input force to push rod 30 return spring 409 moves spool 400 and return spring 51 moves power piston 50 toward the rest position shown in FIG. 1 where actuation chamber 120 is communicated to relief chamber 110 and pressurized supply fluid from pump 24 freely flows to the steering system by way of inlet port 106 in bore 104 toward exit port 108.

In a manual application of the brake booster 12, an input force applied to.brake pedal 28 is communicated through push rod 13 to lever arrangement 80 to initially moves the spool valve 50 to close the communication between passage 112 and relief port 110 and is communicated through head 34 on push rod extension into reaction piston 70 for moving power piston 50 in bore 102 to provide a force to move pistons in master cylinder 13 to effect a brake application.

In a hydraulic operation of the brake booster 12, inputs from ECU 40 supply a signal to open solenoid valve 34 and close solenoid valve 34'. With solenoid valve 34 opened pressurized fluid flows from accumulator 22 by way of port 220 by condiuit 21 to chamber 212 in the second housing 200. This pressurized fluid acts on piston 210 and after overcoming return spring 409 moves spool 400 to initially close communication between passage 112 and relief port 110 and restrict the flow of pressurized supply fluid from the inlet port 106 toward the exit port 108 and thereafter open communication between lands 104c and 408c to flow the controlled pressurized fluid to passage 112 and operational chamber 120 for producing an operational force that is communicated through output rod 53 to move pistons in master cylinder 13 and pressurize fluid therein that is communicated to the wheel brakes 14, 14' and 18, 18' in accordance to inputs supplied to the solenoid valves 15, 15' to attenuate undesirable situations as determined by the inputs evaluated by the ECU 40. When the input signal to the solenoid valve 34 from ECU 40 ends, flow through solenoid valve 34 from accumulator 22 terminates and an input signal is provided to open solenoid valve 34' allow the fluid pressure in chamber 220 to dissipated by flowing through conduit 23 to reservoir 37 associated with electric motor pump 39. Thereafter, return spring 409 moves spool 400 to the position shown in FIG. 2 where passage 112 is communicated with relief port 110 and the power piston 50 is in a rest position.

We claim:

1. A hydraulic brake booster for use in a brake system having a housing with a first bore separated from a second bore, said first bore retaining a power piston and said second bore retaining a control valve, an input member connected to said power piston and linked to said control valve by a lever arrangement, said first bore being connected to said second bore and said second bore being connected to a source of pressurized supply fluid, said lever arrangement being subjected to an actuation force by said input member corresponding to an input force applied to a brake pedal by an operator moving said control valve to allow controlled pressurized supply fluid to be communicated from said second bore to said first bore, said controlled pressurized supply fluid in said first bore acting on said power piston to develop an operational force for effecting a desired brake application, said hydraulic brake booster being characterized by adjustable regulator means connected to said first bore for communicating a proportional reaction signal to said input member derived from said controlled pressurized supply fluid to provide a variable gain between the input force applied to said input member and said operational force developed to effect a brake application.

2. The brake booster as recited in claim 1 wherein said adjustable regulator means is characterized by a stepped bore having an input port connected to said first bore, a control port connected to said input member and a relief port connected to a reservoir, said stepped bore having a first seat located between input port and said' control port and a second seat located between said control port and said relief port and a shaft having a first face separated from a second face by a groove, said shaft being located in said stepped bore such that said first face is positioned adjacent said first seat to define a first restricted orifice and said second face is positioned adjacent said second seat to define a second restricted orifice, said controlled pressurized supply fluid flowing from said inlet port to said relief port through said first and second restricted orifices creating said proportional reaction signal.

3. The brake booster as recited in claim 2 wherein said shaft of said adjustable regulator means is characterized by being moved in said stepped bore to change a space relationship between said first seat and first face and said second seat and said second face and correspondingly change said proportional reaction signal.

4. The brake booster as recited in claim 3 wherein said change in space relationship is characterized by a manual input that rotates said shaft on threads to move said shaft in said stepped bore.

5. The brake booster as recited in claim 3 wherein said first bore in said housing is characterized by first diameter section separated from a second diameter section by a first shoulder and said power piston is characterized by a cylindrical body having a first diameter section separated from a second diameter section by a second shoulder, said first diameter section of said cylindrical body of said power piston being sealingly located in said first diameter section of said first bore to define an actuation chamber for receiving said controlled pressurized supply fluid, said second diameter section of said cylindrical body of said power piston being located in said second diameter section of said first bore in said housing and having a reaction bore therein for receiving said proportional reaction signal from said adjustable regulator means.

6. The brake booster as recited in claim 5 wherein first bore in said housing is further characterized by a groove in said second diameter section through which said proportional reaction signal is communicated to said input member.

7. The brake booster as recited in claim 6 wherein said second diameter section of said power piston is characterized by a radial opening through which said proportional reaction signal is communicated to said reaction bore.

8. The brake booster as recited in claim 7 wherein said input member is characterized by a reaction piston is sealingly located in said reaction bore for receiving said proportional reaction signal, said reaction piston having a projection located outside of said second diameter of said power piston, said lever arrangement being pivotally fixed to said projection for communicating said proportional reaction signal to said input member.

9. The brake booster as recited in claim 8 wherein said reaction piston is further characterized by an axial bore for receiving a projection on linkage of said input member, said projection engaging said reaction piston that in turn engages said power piston to manual transmit an operational force to move said power piston and effect a brake application.

10. The brake booster as recited in claim 1 wherein said adjustable regulator means is characterized by a stepped bore having an input port connected to said first bore, a control port connected to said input member and a relief port connected to a reservoir, said stepped bore having a first seat located between input port and said control port and a shaft having a first face separated from a second face by a groove, said shaft being located in said stepped bore such that said first face is positioned adjacent said first seat to define a first restricted orifice, said controlled pressurized supply fluid flowing from said inlet port to said relief port through said first orifice creating said proportional reaction signal.

11. The brake booster as recited in claim 10 wherein said shaft of said adjustable regulator means is characterized by being moved in said stepped bore to change a space relationship between said first seat and first face and correspondingly said proportional reaction signal.

* * * * *